US008958821B2

(12) United States Patent
Abraham et al.

(10) Patent No.: US 8,958,821 B2
(45) Date of Patent: *Feb. 17, 2015

(54) METHOD AND SYSTEM FOR LOCATION-BASED DYNAMIC RADIO SELECTION

(71) Applicant: Broadcom Corporation, Irvine, CA (US)

(72) Inventors: Charles Abraham, Los Gatos, CA (US); Mark Buer, Gilbert, AZ (US); David Garrett, Tustin, CA (US); Jeyhan Karaoguz, Irvine, CA (US); David Albert Lundgren, Mill Valley, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,010

(22) Filed: Aug. 26, 2013

(65) Prior Publication Data

US 2014/0066076 A1 Mar. 6, 2014

Related U.S. Application Data

(63) Continuation of application No. 12/722,408, filed on Mar. 11, 2010, now Pat. No. 8,521,178.

(60) Provisional application No. 61/304,240, filed on Feb. 12, 2010.

(51) Int. Cl.
*H04W 24/00* (2009.01)
*H04W 36/32* (2009.01)
(Continued)

(52) U.S. Cl.
CPC .............. *H04W 36/32* (2013.01); *H04W 36/30* (2013.01); *H04W 48/18* (2013.01)
USPC .................... 455/456.1; 455/67.11; 455/226.1

(58) Field of Classification Search
USPC ................ 455/456.1, 552.1, 553.1
See application file for complete search history.

(56) References Cited

U.S. PATENT DOCUMENTS 5,999,811 A 12/1999 Molne
7,257,416 B2 8/2007 Lee et al.
(Continued)

FOREIGN PATENT DOCUMENTS

CN 1472984 A 2/2004
CN 1716900 A 1/2006

OTHER PUBLICATIONS

Office Action for Taiwanese Patent Application No. 10320251610, mailed on Feb. 25, 2013.
(Continued)

*Primary Examiner* — Temica M Beamer
(74) *Attorney, Agent, or Firm* — Sterne, Kessler, Goldstein & Fox PLLC

(57) ABSTRACT

A multi-radio mobile device comprises a plurality of different radios. When a location update occurs, the multi-radio mobile device, at a specific location, acquires location-based radio information from a remote location server. The multi-radio mobile device selects a radio for use in the specific location based on the acquired location-based radio information comprising available radios in the specific location and radio weights. The radio is selected from the available radios based on the radio weights in the specific location. Transmissions of a desired service are received in the specific location utilizing the selected radio. Location-based radio measurements reports to the remote location server are generated utilizing signal strength measurements for the received signals. Radio quality information of the available radios is calculated by the location server utilizing location-based radio measurement reports from associated users. The radio weights of the available radios are determined based on the calculated radio quality information.

20 Claims, 6 Drawing Sheets

(51) Int. Cl.
*H04W 36/30* (2009.01)
*H04W 48/18* (2009.01)

(56) References Cited

U.S. PATENT DOCUMENTS

| | | |
|---|---|---|
| 7,610,057 B2 | 10/2009 | Bahl et al. |
| 8,000,276 B2 | 8/2011 | Scherzer et al. |
| 8,010,105 B2 | 8/2011 | Buckley et al. |
| 2003/0225893 A1 | 12/2003 | Roese et al. |
| 2005/0282579 A1 | 12/2005 | Kim |
| 2006/0121914 A1 | 6/2006 | Kim et al. |
| 2006/0227745 A1 | 10/2006 | Olvera-Hernandez et al. |
| 2007/0207815 A1 | 9/2007 | Alfano et al. |
| 2007/0230420 A1 | 10/2007 | Bumiller et al. |
| 2007/0268877 A1 | 11/2007 | Buckley et al. |
| 2008/0186882 A1 | 8/2008 | Scherzer et al. |
| 2009/0005041 A1 | 1/2009 | Steinberg et al. |
| 2009/0104907 A1 | 4/2009 | Otting et al. |
| 2009/0275348 A1 | 11/2009 | Weinreich et al. |
| 2010/0067434 A1 | 3/2010 | Siu et al. |
| 2011/0164602 A1 | 7/2011 | Tysowski et al. |
| 2011/0201335 A1 | 8/2011 | Garrett et al. |
| 2011/0201336 A1 | 8/2011 | Garrett et al. |
| 2011/0223935 A1 | 9/2011 | Alfano et al. |

OTHER PUBLICATIONS

Office Action for Chinese Patent Application No. 201110036822.1, mailed on Aug. 2, 2013.
Office Action for Chinese Patent Application No. 201110036822.1, mailed on Mar. 14, 2014.
European Search Report directed to related European Patent Application No. 11001047.7, mailed Jul. 28, 2014; 4 pages.

METHOD AND SYSTEM FOR LOCATION-BASED DYNAMIC RADIO SELECTION

CROSS-REFERENCE TO RELATED APPLICATIONS

This application is a continuation application of U.S. application Ser. No. 12/722,408, filed Mar. 11, 2010, which claims priority to and claims the benefit of U.S. Provisional Application No. 61/304,240, filed Feb. 12, 2010, both of which are incorporated herein by reference.

This application also makes reference to:
U.S. application Ser. No. 12/729,202, filed Mar. 22, 2010; and
U.S. application Ser. No. 12/729,208, filed Mar. 22, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for location-based dynamic radio selection.

BACKGROUND OF THE INVENTION

Next generation mobile networks will utilize several different radio access technologies such as, for example, Global System for Mobile Communications (GSM), Universal Mobile Telecommunications System (UMTS), wireless local area networks (WLAN), Bluetooth networks and Worldwide Interoperability for Microwave Access (WiMAX) networks integrated to form a heterogeneous wireless access network system. Different radio access networks provide different levels of capacity and coverage to end users. A wide variety of services are delivered to end users over the heterogeneous wireless access network system using different radio access technologies. The utilization of the heterogeneous wireless access network system assures end users enhanced network connection any where any time so as to improve the quality of service.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for location-based dynamic radio selection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for location-based dynamic radio selection. In various embodiments of the invention, a multi-radio mobile device that comprises a plurality of different radios such as a WLAN radio and a WiMAX radio may be operable to perform a location-based dynamic radio selection. For example, in instances where a location update occurs, the multi-radio mobile device at a specific location may acquire corresponding location-based radio information from a remote location server. The multi-radio mobile device may select, from the plurality of different radios, a radio that is to be utilized at the specific location based on the acquired location-based radio information. The acquired location-based radio information comprises available radios in the specific location and corresponding radio weights. The radio may be selected from the available radios based on the corresponding radio weights in the specific location.

Transmissions of a desired service may be received by the multi-radio mobile device at the specific location utilizing the selected radio. Signal strength of the received transmissions may be measured at the specific location. A location-based radio measurement report on the selected radio may be generated utilizing the signal strength measurements, information on the selected radio, and information on the specific location of the multi-radio mobile device. The generated location-based radio measurement report may be communicated to the remote location server to build or refine a reference location-database. The location server may be operable to track or receive a plurality of location related information such as location-based radio measurement reports corresponding to the specific location of the multi-radio mobile device from a plurality of users such as mobile devices. Radio quality information such as uncertainty levels or reliability levels of the available radios in the specific location of the multi-radio mobile device may be calculated by the location server utilizing the received plurality of location-based radio measurement reports. The corresponding radio weights of the available radios in the specific location may be determined based on the calculated radio quality information.

Figure 1:
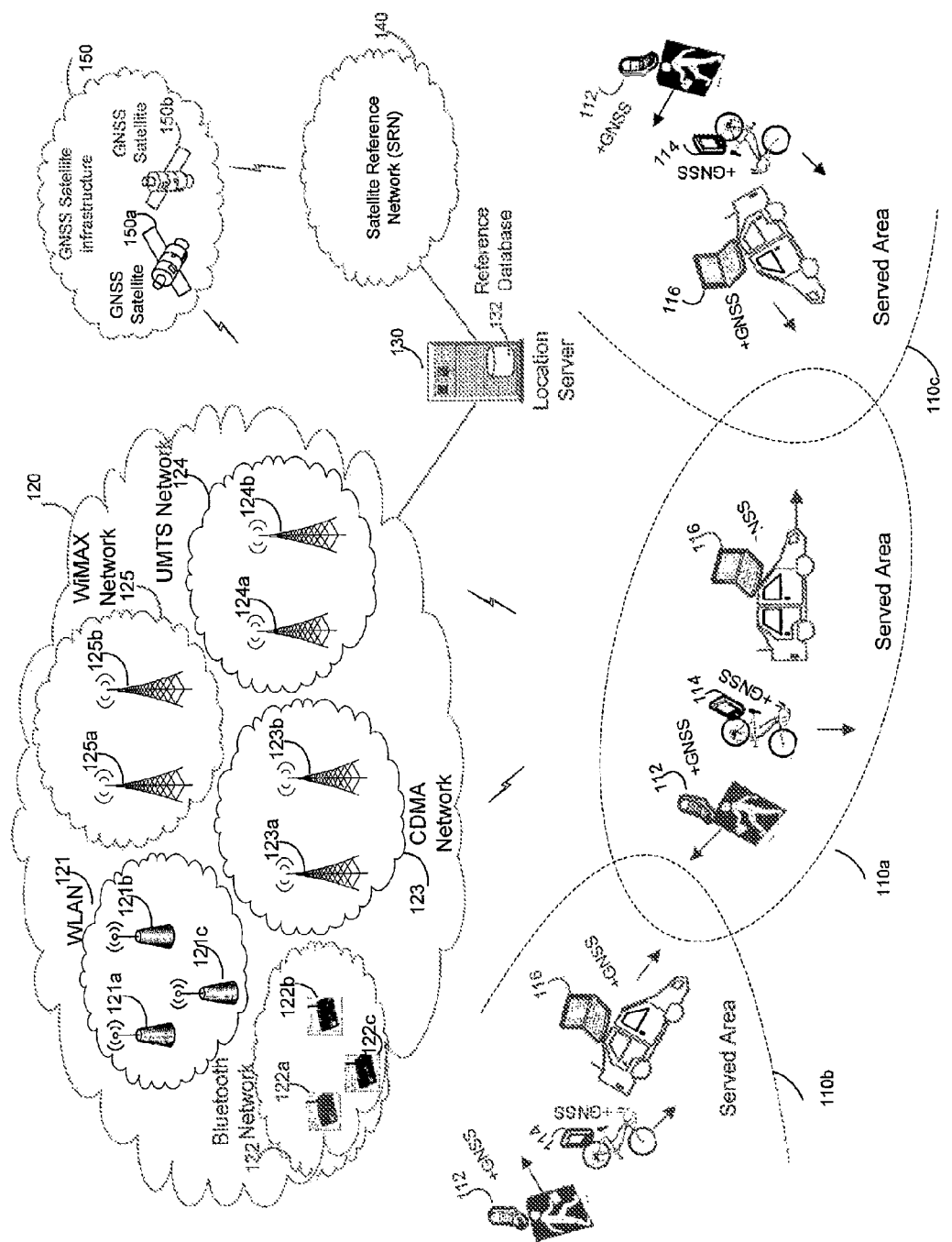
FIG. 1 is a diagram illustrating an exemplary communication system that is operable to support location-based dynamic radio selection, in accordance with an embodiment of the invention.

FIG. 1 is a diagram illustrating an exemplary communication system that is operable to support location-based dynamic radio selection, in accordance with an embodiment of the invention. Referring to FIG. 1, there is shown a communication system 100. The communication system 100 comprises served areas 110a-110c, a plurality of multi-radio mobile devices, of which multi-radio mobile devices 112-116 are illustrated, a heterogeneous network system 120, a location server 130 comprising a reference database 132, a satellite reference network (SRN) 140 and a Global Navigation Satellite Systems (GNSS) satellite infrastructure 150. The heterogeneous network system 120 comprises a plurality of different radio access networks, of which a WLAN 121, a Bluetooth network 122, a CDMA network 123, a UMTS network 124 and a WiMAX network 125 are illustrated.

The multi-radio mobile devices 112-116 may comprise suitable logic, circuitry, interfaces and/or code that are operable to communicate radio frequency signals with a plurality of mobile communication access networks such as, for example, the WLAN 121, the Bluetooth network 122, the CDMA network 123, the UMTS network 124 and/or the WiMAX network 125. Depending on device capabilities, a multi-radio mobile device such as the multi-radio mobile device 112 may be operable to utilize one or more radios such as a WLAN radio and a cellular radio to communicate with corresponding radio sites to receive a desired service. Radio sites, as used herein, of a specific radio access network comprises one or more base stations or access points. An appropriate radio such as a WLAN radio may be selected from a set of available radios for the reception of the desired service.

In an exemplary embodiment of the invention, the multi-radio mobile device 112 may be operable to measure signal strength on the selected radio. The signal strength measurements may be carried out on the selected radio at various locations over a period of time. In this regard, a location of the multi-radio mobile device 112 may be determined in response to corresponding signal strength measurements for the selected radio. The signal strength measurements at the determined location of the multi-radio mobile device 112 may vary according to corresponding radio selection information. The radio selection information may comprise information related to, for example, which radio access network is selected and which radio site, base station or access point, may be utilized by the multi-radio mobile device 112 at the determined location. In this regard, the multi-radio mobile device 112 may be operable to utilize the determined location to location stamp the radio selection information and corresponding signal strength measurements to generate a location-based radio measurement report. The generated location-based radio measurement report may be communicated to the location server 130 to build the reference database 132.

In another exemplary embodiment of the invention, radio information such as, for example, available radios and/or radio quality information such as uncertainty or reliability levels of the available radios may vary at different locations. In this regard, the multi-radio mobile device 112 may be operable to acquire location-based radio information from the location server 130, for example, whenever a location update occurs. In an exemplary embodiment of the invention, in instances where the multi-radio mobile device 112 is travelling from a location in the served area 110*a* into a location in the served area 110*b*, the multi-radio mobile device 112 may be operable to acquire location-based radio information with respect to the location in the served area 110*b* from the location server 130. The acquired location-based radio information may be utilized by the multi-radio mobile device 112 to determine which radios and radio sites may be selected for use in the location in the served area 110*b* to support a desired service. For example, the multi-radio mobile device 112 may select a radio site of an available radio having the highest radio reliability level or the lowest radio uncertainty level over the available radios in the location in the served area 110*b*.

The heterogeneous network system 120 may comprise suitable devices, circuitry, interfaces and/or code that are operable to provide radio connections between a wireless mobile device such as the multi-radio mobile device 112 and a selected radio site of an appropriate wireless radio communication system or radio network according to usage and/or mobility status of the multi-radio mobile device 112. Different radio access technologies may be utilized in the heterogeneous network system 120 to provide the multi-radio mobile device 112 with an access to a desired service. In particular, the heterogeneous network system 120 may be operable to support a location-based dynamic radio selection at associated users such as the multi-radio mobile device 112 to optimize radio usage on the multi-radio mobile device 112.

The WLAN 121 may comprise suitable devices, circuitry, interfaces and/or code that are operable to provide data services to various wireless LAN enabled communication devices such as the multi-radio mobile device 112 using wireless LAN technology. Exemplary wireless LAN technology may comprise, for example, IEEE Standard 802.11, 802.11a, 802.11b, 802.11d, 802.11e, 802.11g, 802.11n, 802.11v, and/or 802.11u. The WLAN 121 comprises a plurality of WLAN access points such as WLAN access points (APs) 121*a* through 121*c*. The WLAN 121 may be operable to communicate various data services such as a location-based service (LBS) over WLAN connections between the WLAN APs 121*a* through 121*c* and corresponding WLAN capable devices such as, for example, the multi-radio mobile device 112. In this regard, signal strength of signals that are communicated via WLAN connections between the multi-radio mobile device 112, at a specific location, and a WLAN AP such as the WLAN AP 121*a* may be measured by the multi-radio mobile device 112. Radio quality information such as uncertainty or reliability levels in the specific location with regard to the WLAN AP 121*a* may be evaluated or determined by the location server 130. The location of the WLAN AP 121*a* may be determined for location-based application such as location-based access control on the WLAN AP 121*a*. The signal strength measurements in the specific location on transmissions from the WLAN AP 121*a*, location information of the WLAN AP 121*a*, and radio quality information in the specific location with regard to the WLAN AP 121*a* may be collected or tracked by the location server 130. The location server 130 may be operable to share the collected information among a plurality of users such as the multi-radio mobile devices 112-116 to support location-based radio selection.

The Bluetooth network 122 may comprise suitable devices, circuitry, interfaces and/or code that are operable to provide data services to various Bluetooth enabled mobile devices such as the multi-radio mobile device 112 using Bluetooth technology. Exemplary Bluetooth technology may comprise, for example, IEEE Standard IEEE 802.15 WPAN and/or IEEE 802.15.4. The Bluetooth network 122 comprises a plurality of Bluetooth access points such as Bluetooth access points 122*a* through 122*c*. The Bluetooth network 122 may be operable to communicate various data services such as a location-based service (LBS) over Bluetooth connections between, for example, the multi-radio mobile device 112 and a Bluetooth access point (AP) such as the Bluetooth AP 122*a*. In this regard, signal strength of signals that are communicated via Bluetooth connections between the multi-radio mobile device 112, at a specific location, and a Bluetooth AP such as the Bluetooth AP 122*a* may be measured by the multi-radio mobile device 112. Radio quality information such as uncertainty or reliability levels in the specific location with regard to the Bluetooth AP 122*a* may be evaluated or determined by the location server 130. The location of the Bluetooth AP 122a may be determined for location-based application such as location-based access control on the Bluetooth AP 122a. The signal strength measurements, at a specific location, of signals communicated by the Bluetooth AP 122a, location information of the Bluetooth AP 122a, and radio quality information at the specific location with regard to the Bluetooth AP 122a may be collected or tracked by the location server 130. The location server 130 may be operable to share the collected information among a plurality of users such as the multi-radio mobile devices 112-116 to support location-based radio selection.

The CDMA network 123 may comprise suitable devices, circuitry, interfaces and/or code that are operable to provide data services to various CDMA enabled mobile devices such as the multi-radio mobile device 112 using CDMA technology. The CDMA network 123 comprises a plurality of base stations such as base stations 123a through 123b. The CDMA network 123 may be operable to communicate various data services such as a location-based service (LBS) over CDMA connections between, for example, the multi-radio mobile device 112 and a CDMA base station such as the base station 123a. In this regard, signal strength of signals that are communicated via COMA connections between the multi-radio mobile device 112, at a specific location, and a CDMA base station such as the base station 123a may be measured by the multi-radio mobile device 112. Radio quality information such as uncertainty or reliability levels in the specific location with regard to the base station 123a may be evaluated or determined by the location server 130. The location of the base station 123a may be determined for location-based application such as location-based access control on the base station 123a. The signal strength measurements, at a specific location, of signals communicated by the base station 123a, location information of the base station 123a, and radio quality information in the specific location with regard to the base station 123a may be collected or tracked by the location server 130. The location server 130 may be operable to share the collected information among a plurality of users such as the multi-radio mobile devices 112-116 to support location-based radio selection.

The UMTS network 124 may comprise suitable devices, circuitry, interfaces and/or code that are operable to provide data services to various UMTS enabled mobile devices such as the multi-radio mobile device 112 using UMTS technology. The UMTS network 124 comprises a plurality of base stations such as base stations 124a through 124b. The UMTS network 124 may be operable to communicate various data services such as a location-based service (LBS) over UMTS connections between, for example, the multi-radio mobile device 112 and a UMTS base station such as the base station 124a. In this regard, signal strength of signals that are communicated via UMTS connections between the multi-radio mobile device 112, at a specific location, and a UMTS base station such as the base station 124a may be measured by the multi-radio mobile device 112. Radio quality information such as uncertainty or reliability levels at the specific location with regard to the base station 124a may be evaluated or determined by the location server 130. The location of the base station 124a may be determined for location-based application such as location-based access control on the base station 124a. The signal strength measurements, at the specific location, of signals communicated by the base station 124a, location information of the base station 124a, and radio quality information at the specific location with regard to the base station 124a may be collected or tracked by the location server 130. The location server 130 may be operable to share the collected information among a plurality of users such as the multi-radio mobile devices 112-116 to support location-based radio selection.

The WiMAX network 125 may comprise suitable devices, circuitry, interfaces and/or code that are operable to provide data services to various WiMAX enabled mobile devices such as the multi-radio mobile device 112 using WiMAX technology. The WiMAX network 125 comprises a plurality of WiMAX base stations such as base stations 125a through 125b. The WiMAX network 125 may be operable to communicate various data services such as a location-based service (LBS) over WiMAX connections between, for example, the multi-radio mobile device 112 and a WiMAX base station such as the base station 125a. In this regard, signal strength of signals that are communicated via WiMAX connections between the multi-radio mobile device 112, at a specific location, and a WiMAX base station such as the base station 125a may be measured by the multi-radio mobile device 112. Radio quality information such as uncertainty or reliability levels in the specific location with regard to the base station 125a may be evaluated or determined by the location server 130. The location of the base station 125a may be determined for location-based application such as location-based access control on the base station 125a. The signal strength measurements, at a specific location, for signals communicated by the base station 125a, location information of the base station 125a, and radio quality information in the specific location with regard to the base station 125a may be collected or tracked by the location server 130. The location server 130 may be operable to share the collected information among a plurality of users such as the multi-radio mobile devices 112-116 to support location-based radio selection.

The location server 130 may comprise suitable logic, circuitry, interfaces and/or code that are operable to access the satellite reference network (SRN) 140 to collect GNSS satellite data by tracking GNSS constellations through the SRN 140. The location server 130 may be operable to utilize the collected GNSS satellite data to generate GNSS assistance data comprising, for example, ephemeris data, LTO data, reference positions and/or time information. The location server 130 may be operable to collect and/or retrieve location related information for associated users. In this regard, the location server 130 may be operable to collect or receive location-based radio measurement reports from a plurality of users such as the multi-radio mobile devices 112-116. A location-based radio measurement report received from, for example, the multi-radio mobile device 112, may comprise information such as location information of the multi-radio mobile device 112, a selected radio and corresponding signal strength measurements in the specific location on the selected radio. In instances where a radio site such as the base station 123a in the CDMA network 123 is selected by the multi-radio mobile device 112 at a specific location, radio quality information such as uncertainty or reliability levels in the specific location with regard to the base station 123a may be calculated by the location server 130 utilizing corresponding radio signal strength measurements in the specific location on the base station 123. A radio weight in the specific location for the base station 123a may be determined based on the calculated radio quality information. A radio weight provides a relative measure of radio quality. For example, a lesser radio weight is ascribed to a radio with lower radio quality. The calculated radio quality information and/or the determined radio weight in the specific location for the base station 123a may be stored in the reference database 132.

The location server 130 may be operable to provide radio information such as radio quality information or radio weight for users according to user location information. For example, in instances where the location server 130 receives a radio information request from a user such as the multi-radio mobile device 112 for a specific location, the location server 130 may be operable to identify radios and corresponding radio sites, namely, base stations or access points, available to serve the specific location and/or surrounding areas. Radio quality information or radio weights in the specific location with regard to the identified radio sites may be retrieved from the reference database 132. Information such as the identified available radios for the specific location, location information of the identified available radio sites, and/or the retrieved radio quality information or radio weights in the specific location for the identified available radio sites may be utilized by the location server 130 to generate location-based radio information for the multi-radio mobile device 112 for the specific location. The generated location-based radio information may be communicated to the multi-radio mobile device 112 to support location-based radio selection.

The SRN 140 may comprise suitable logic, circuitry, interfaces and/or code that are operable to collect and/or distribute data for GNSS satellites on a continuous basis. The SRN 140 may comprise a plurality of GNSS reference tracking stations located around the world to provide assistant GNSS (A-GNSS) coverage all the time in both a home network and/or any visited network.

The GNSS satellites 150a through 150b may comprise suitable logic, circuitry, interfaces and/or code that may be operable to generate and broadcast satellite navigational information. The broadcast satellite navigational information may be collected by the SRN 140 to be utilized by the location server 130 to enhance LBS services. The GNSS satellites 150a through 150b may comprise GPS, Galileo, and/or GLONASS satellites.

In an exemplary operation, a multi-radio mobile device such as the multi-radio mobile device 112 may be operable to utilize an appropriate radio that is selected from a set of available radios to receive a desired service. Signal strength for the selected radio may be measured by the multi-radio mobile device 112 at various locations over a period of time. A location of the multi-radio mobile device 112 may be determined in response to corresponding signal strength measurements for the selected radio. The signal strength measurements and associated radio selection information such as radio access network selection and radio site selection may be location stamped utilizing the determined location of the multi-radio mobile device 112 to generate a location-based radio measurement report. The generated location-based radio measurement report may be provided to the location server 130 to build the reference database 132. The location server 130 may be operable to track location information of associated communication devices such as the multi-radio mobile devices 112-116, the base stations 123a-123c, and/or the Bluetooth access points 122a-122c. Radio quality information such as reliability levels or uncertainty levels of various radios such as cellular radio and WLAN radio may be evaluated by the location server 130 with regard to locations of interest. For example, the location server 132 may be operable to determine or calculate radio quality information of radios available at a specific location based on a plurality of received location-based radio measurement reports for the specific location. Radio weights for the available radios in the specific location may be determined based on the corresponding calculated radio quality information. The determined radio weights in the specific location may be stored in the reference database 132. In instances where a request for radio information is received from, for example, the multi-radio mobile device 112 in the specific location, the location server 130 may be operable to communicate with the reference database 132 to retrieve radio information related to the specific location. The retrieved location-based radio information may comprise radios available at the specific location, location information of corresponding radio sites serving the specific location and/or radio quality information for the specific location. The location server 130 may be operable to provide the location-based radio information to the multi-radio mobile device 112 for location-based radio selection. For example, the multi-radio mobile device 112 may be operable to select an available radio having the highest radio weight over the available radios in the specific location to support a desired service.

Figure 2:
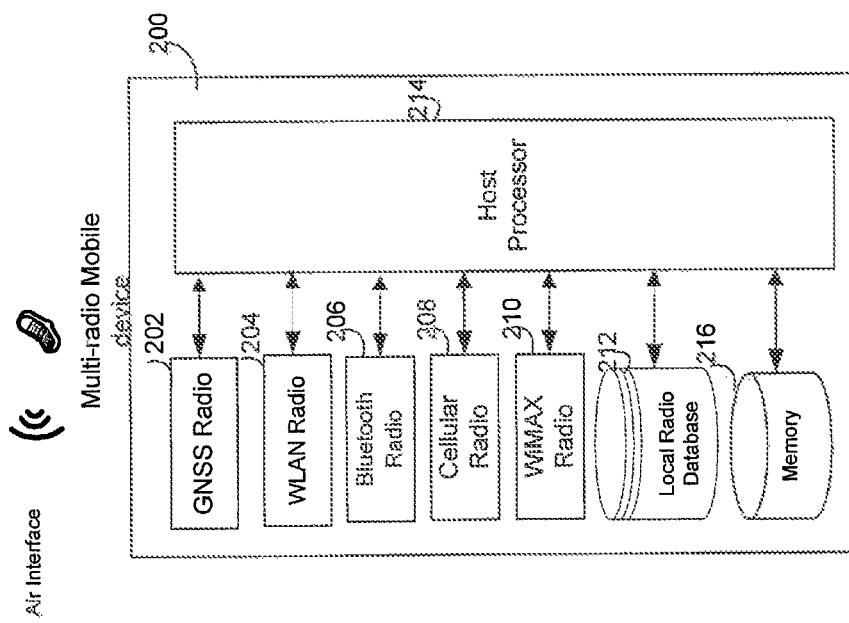
FIG. 2 is a block diagram illustrating an exemplary multi-radio mobile device that is operable to perform location-based dynamic radio selection, in accordance with an embodiment of the invention.

FIG. 2 is a block diagram illustrating an exemplary multi-radio mobile device that is operable to perform location-based dynamic radio selection, in accordance with an embodiment of the invention. Referring to FIG. 2, there is shown a multi-radio mobile device 200. The multi-radio mobile device 200 comprises a GNSS radio 202, a WLAN radio 204, a Bluetooth radio 206, a cellular radio 208, a WiMAX radio 210, a location radio database 212 and a memory 216.

The GNSS radio 202 may comprise suitable logic, circuitry, interfaces and/or code that may be operable to detect and receive GNSS signals from a plurality of visible GNSS satellites such as the GNSS satellite 162-166. The GNSS radio 202 may be operable to utilize the received GNSS signals to calculate navigation information such as a GNSS position and/or a velocity of the GNSS radio 202. The calculated GNSS position of the GNSS radio 202 may be provided to the host processor 214 for various applications such as, for example, to location stamp signal strength measurements for a selected radio.

The WLAN radio 204 may comprise suitable logic, circuitry, interfaces and/or code that may be operable to receive and/or transmit radio frequency signals using wireless LAN technology. The WLAN radio 204 may be operable to transmit and/or receive radio frequency (RF) signals over WLAN connections between the multi-radio mobile device 200 and a WLAN AP such as the WLAN AP 121a. In this regard, RF signals received over the WLAN radio 202 may be communicated to the host processor 214 to calculate or measure signal strength of the WLAN radio 202.

The Bluetooth radio 206 may comprise suitable logic, circuitry, interfaces and/or code that may be operable to receive and/or transmit radio frequency signals using Bluetooth technology. The Bluetooth radio 206 may be operable to transmit and/or receive radio frequency (RF) signals over Bluetooth connections between the multi-radio mobile device 200 and a Bluetooth AP such as the Bluetooth AP 122a. In this regard, RF signals received over the Bluetooth radio 206 may be communicated to the host processor 214 to calculate or measure signal strength of the Bluetooth radio 206.

The cellular radio 208 may comprise suitable logic, circuitry, interfaces and/or code that may be operable to receive and/or transmit radio frequency signals using various cellular technologies such as, for example, CDMA, UMTS, GSM and/or LTE. The cellular radio 208 may be operable to transmit and/or receive radio frequency (RF) signals over cellular radio connections between the multi-radio mobile device 200 and a cellular base station such as the base station 123a in the CDMA network 123. In this regard, RF signals received over the cellular radio 208 may be communicated to the host processor 214 to calculate or measure signal strength of the cellular radio 208.

The WiMAX radio 210 may comprise suitable logic, circuitry, interfaces and/or code that may be operable to receive and/or transmit radio frequency signals using WiMAX technology. The WiMAX radio 210 may be operable to transmit and/or receive radio frequency (RF) signals over WiMAX radio connections between the multi-radio mobile device 200 and a WiMAX base station such as the base station 125a in the WiMAX network 125. In this regard, RF signals received over the WiMAX radio 210 may be communicated to the host processor 214 to calculate or measure signal strength of the WiMAX radio 210.

The local radio database 212 may comprise suitable logic, circuitry, interfaces and/or code that may be operable to record and store data related to local radio information. The stored data may comprise, for example, signal strength measurements for selected radios, and radio selection information. The stored data may also comprise location-based radio information such as, for example, available radios in various locations of the multi-radio mobile device 200, location information of radio sites of the available radios, and/or radio quality information. The contents of the local radio database 212 may be utilized by the multi-radio mobile device 200 for location-based radio selection. At least a portion of the local radio database 212 may be communicated to the location server 130 to build and/or refine the reference database 132. The local radio database 212 may be updated or refined on an as needed basis, aperiodically or periodically.

The host processor 214 may comprise suitable logic, circuitry, interfaces and/or code that may be operable to manage and/or control operations of associated device component units such as, for example, the GNSS radios 202, the cellular radio 208, and/or the local radio database 212, depending on usages. For example, the host processor 214 may be operable to activate or deactivate one or more associated radios such as the GNSS radio 202 on an as needed basis in order to save power. The host processor 214 may be configured to coordinate operations of associated device component units for particular applications. Depending on device capabilities, the host processor 214 may be operable to utilize one or more radios such as the WLAN radio 204 and the cellular radio 208 to receive a desired service. In this regard, the host processor 214 may select an appropriate radio from a set of available radios for the reception of the desired service.

In an exemplary embodiment of the invention, the host processor 214 may be operable to measure signal strength on the selected radio such as the WLAN radio 204 utilizing signals received over the WLAN radio 204 from a WLAN AP such as the WLAN AP 121a. The signal strength measurements may be carried out on signals received over the WLAN radio 204 at various locations. In this regard, the host processor 214 may activate the GNSS radio 202 to determine location information of the multi-radio mobile device 200 corresponding to the signal strength measurements. The host processor 214 may be operable to location stamp the signal strength measurements and associated radio selection information utilizing the determined locations of the multi-radio mobile device 200. The resulting location-stamped information may be utilized by the host processor 214 to generate a location-based radio measurement report. The generated location-based radio measurement report may be communicated to the location server 130 to build the reference database 132.

In another exemplary embodiment of the invention, in instances where a location update occurs, for example, the multi-radio mobile device 200 is moving from an indoor location to an outdoor location, the host processor 214 may be operable to send a radio information request to the location server 130 to acquire location-based radio information for the outdoor location. The acquired location-based radio information may comprise information such as, for example, what are the radios available in the outdoor location, radio weights of the available radios in the outdoor location, and/or location information of radio sites of the available radios in vicinity of the outdoor location. The host processor 214 may be operable to utilize the acquired location-based radio information to determine which radios may be selected for use in the outdoor location to support a desired service. The host processor 214 may be operable to select an appropriate radio for the outdoor location according to corresponding radio weights and device capabilities. For example, a cellular radio such as the cellular radio 208 that has the highest radio weight over the available radios in the outdoor location may be selected to support the desired service in the outdoor location.

The memory 216 may comprise suitable logic, circuitry, interfaces and/or code that may be operable to store information such as executable instructions and data that may be utilized by the host processor 214 and/or other associated component units such as, for example, the WLAN radio 204 and the Bluetooth radio 206. The memory 216 may comprise RAM, ROM, low latency nonvolatile memory such as flash memory and/or other suitable electronic data storage.

In an exemplary operation, the host processor 214 may be operable to manage and coordinate operations of the associated device units to dynamically select appropriate radios for use based on the location of the multi-radio mobile device 200. In this regard, the host processor 214 may be operable to monitor the performance of a selected radio such as the cellular radio 208 by measuring signal strength on signals received over the cellular radio 208. Corresponding location information of the multi-radio mobile device 200 for the signal strength measurements may be determined utilizing GNSS signals received over the GNSS radio 202. The signal strength measurements and associated radio selection information may be location stamped utilizing the corresponding determined locations of the multi-radio mobile device 112 to generate a location-based radio measurement report. The generated location-based radio measurement report may be communicated to the location server over the cellular radio 208.

In instances where the multi-radio mobile device 200 is moving to a specific location, for example, in the served area 110b, the host processor 214 may be operable to communicate the location server 130 for location-based radio information with regard to the specific location in the served area 110b. The acquired location-based radio information may be utilized by the host processor 214 to determine an appropriate radio for use in the specific location to support a desired service. For example, a radio may be selected for the specific location in the served area 110b according to corresponding radio weights and device capabilities of the multi-radio mobile device 200.

Figure 3:
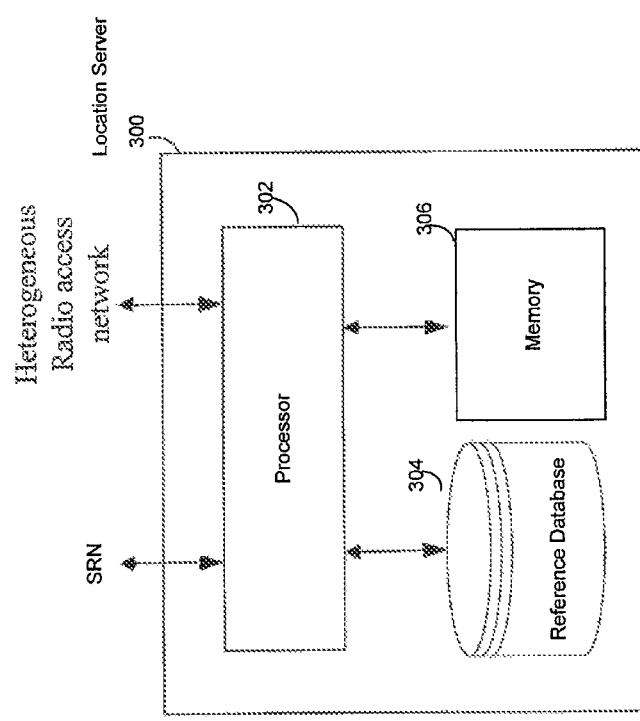
FIG. 3 is a block diagram illustrating an exemplary location server that is operable to provide location-based radio information to users, in accordance with an embodiment of the invention.

FIG. 3 is a block diagram illustrating an exemplary location server that is operable to provide location-based radio information to users, in accordance with an embodiment of the invention. Referring to FIG. 3, there is shown a location server 300. The location server 300 may comprise a processor 302, a reference database 304 and a memory 306.

The processor 302 may comprise suitable logic, circuitry, interfaces and/or code that may be operable to manage and/or control operations of the reference database 304 and the memory 306. The processor 302 may be operable to communicate with the satellite reference network (SRN) 150 so as to collect GNSS satellite data by tracking GNSS constellations through the SRN 150. The processor 302 may be operable to utilize the collected GNSS satellite data to build the reference database 304, which may be coupled internally or externally to the location server 300.

The processor 302 may be operable to collect and/or retrieve location related information for associated users. In this regard, the processor 302 may be operable to receive location-based radio measurement reports from a plurality of users such as the multi-radio mobile devices 112-116. The received location-based radio measurement reports may comprise information such as locations of the multi-radio mobile devices 112-116, associated radio selection and corresponding signal strength measurements. The processor 302 may be operable to evaluate or determine radio quality information such as uncertainty or reliability levels in various locations of the multi-radio mobile devices 112-116 utilizing the corresponding signal strength measurements. Radio weights for selected radios may be calculated based on the determined location-based radio quality information. The calculated radio weights may be stored in the reference database 304.

Location-based radio quality information may be provided to users according to user location information. For example, in instances where the processor 302 receives a radio information request from a user such as the multi-radio mobile device 112 at a specific location, the processor 302 may be operable to identify radios and corresponding radio sites serving the specific location and/or surrounding areas. Location-based radio weights in the specific location may be retrieved with regard to the identified radio sites from the reference database 132. Location-based radio information such as, for example, the identified available radios in the specific location, location information of the identified radio sites, and/or the retrieved location-based radio weights for the identified radio sites may be generated by the processor 302 to provide to the multi-radio mobile device 112 for location-based radio selection.

The memory 306 may comprise suitable logic, circuitry, interfaces and/or code that may be operable to store information such as executable instructions and data that may be utilized by the processor 302 and/or other associated component units such as, for example, the reference database 304. The memory 306 may comprise RAM, ROM, low latency nonvolatile memory such as flash memory and/or other suitable electronic data storage.

In an exemplary operation, the processor 302 may be operable to track location related information of associated users to build the reference database 304. The processor 302 may be operable to collect and/or retrieve location related information such as location-based radio measurement reports from associated users. The received location-based radio measurement reports may comprise information such as locations of users such as the multi-radio mobile devices 112-116, associated radio selection and corresponding signal strength measurements. The processor 302 may be operable to determine location-based radio weights based on signal strength measurements in the received location-based radio measurement reports. The determined location-based radio weights may be stored in reference database 304 so that it may be shared among the users. In this regard, the processor 302 may be operable to provide location-based radio information such as available radios and corresponding radio weights to users according to user location information. The location-based radio information may be communicated to, for example, the multi-radio mobile device 112, to support location-based radio selection.

Figure 4:
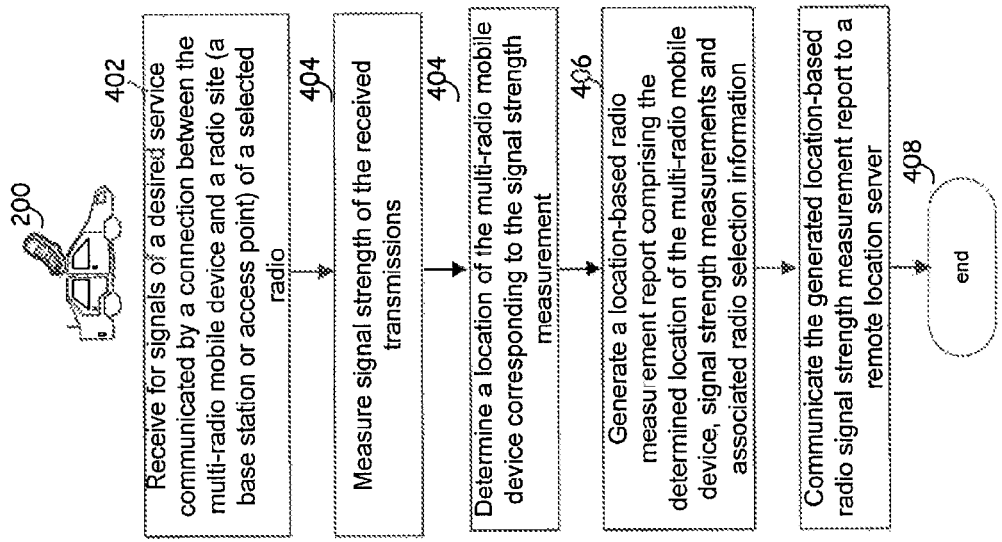
FIG. 4 is a flow chart illustrating exemplary steps for generating a location-based radio measurement report by a multi-radio mobile device, in accordance with an embodiment of the invention.

FIG. 4 is a flow chart illustrating exemplary steps for generating a location-based radio measurement report by a multi-radio mobile device, in accordance with an embodiment of the invention. Referring to FIG. 4, the exemplary steps may start with step 402. In step 402, a multi-radio mobile device such as the multi-radio mobile device 200 may be operable to receive transmissions of a desired service over a connection between the multi-radio mobile device 112 and a radio site of a selected radio, for example, the base station 125*a* in the WiMAX network 125. In step 404, the host processor 214 may be operable to calculate signal strength measurements for signals communicated by the WiMAX radio 210. In step 406, the host processor 214 may be configured to activate the GNSS radio 202 for GNSS signals from visible GNSS satellite such as the GNSS satellites 162-166. The GNSS signals received over the GNSS radio 202 may be utilized by the host processor 214 to calculate or determine a location of the multi-radio mobile device 200 corresponding to the signal strength measurements. In step 408, the host processor 214 may be operable to generate a location-based radio measurement report utilizing the determined location of the multi-radio mobile device 200, the signal strength measurements and corresponding radio selection information. In step 410, the host processor 214 may be operable to communicate the generated location-based radio signal strength measurement report to a remote location server such as the location server 300 to build or refine the reference database 304.

Figure 5:
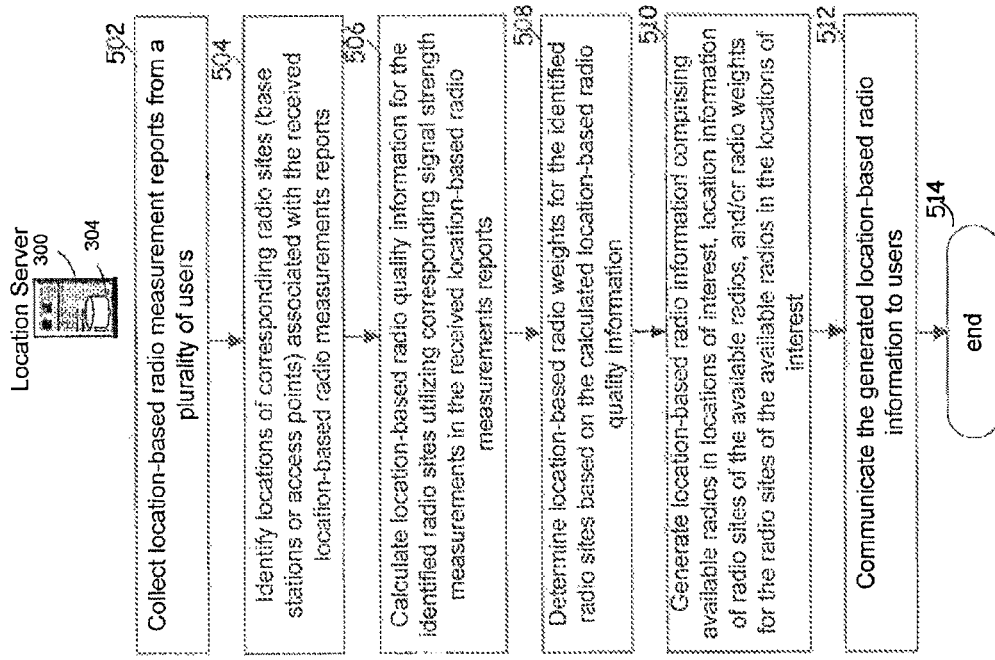
FIG. 5 is a flow chart illustrating exemplary steps for tracking location-based radio measurements to build reference database by a location server, in accordance with an embodiment of the invention.

FIG. 5 is a flow chart illustrating exemplary steps for tracking location-based radio measurements to build reference database by a location server, in accordance with an embodiment of the invention. Referring to FIG. 5, the exemplary steps may start with step 502. In step 502, the location server 300 may be operable to collect location-based radio measurement reports from a plurality of users such as the multi-radio mobile devices 112-116. The received location-based radio measurement reports comprise information such as signal strength measurements for specific radio sites and/or locations where the signal strength measurements were performed. In step 504, the location server 300 may be operable to identify locations of the specific radio sites. In step 506, the location server 300 may be operable to calculate location-based radio quality information such as uncertainty levels or reliability levels for the identified specific radio sites utilizing corresponding signal strength measurements in the received location-based radio measurements reports. In step 508, the location server 300 may be operable to determine location-based radio weights for the identified specific radio sites based on the calculated location-based radio quality information. In step 510, the location server 300 may be operable to generate location-based radio information for an intended location of a multi-radio mobile device 200 such as the multi-radio mobile device 200. The generated location-based radio information comprises information such as, for example, available radios in the intended location, location information of radio sites of the available radios in vicinity of the intended location, and/or radio weights in vicinity of the intended location for the radio sites of the available radios. In step 512, the location server 300 may be operable to communicate the generated location-based radio information to intended users when needed.

Figure 6:
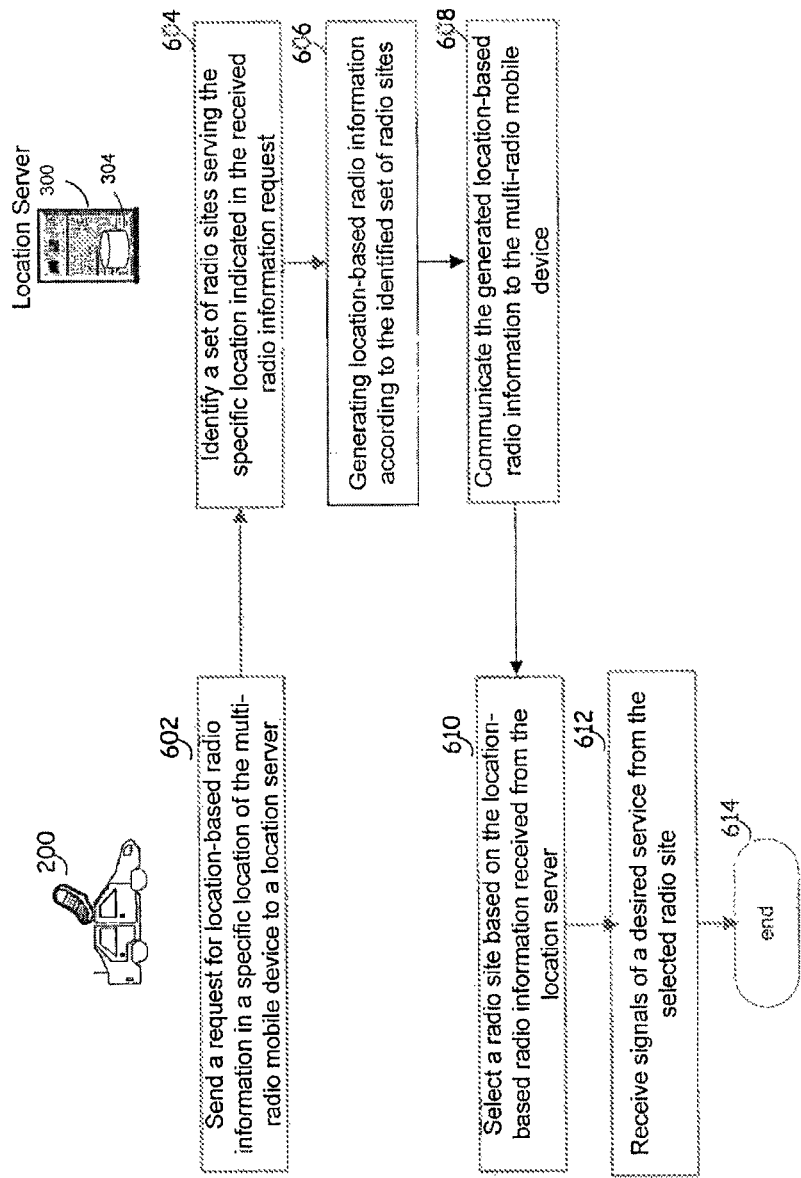
FIG. 6 is a flow chart illustrating exemplary steps for performing location-based dynamic radio selection, in accordance with an embodiment of the invention.

FIG. 6 is a flow chart illustrating exemplary steps for performing location-based dynamic radio selection, in accordance with an embodiment of the invention. Referring to FIG. 6, the exemplary steps may start with step 602. In step 602, a multi-radio mobile device such as the multi-radio mobile device 112 may be operable to receive transmissions of a desired service. In instances where the multi-radio mobile device 112 is moving to a different location such as a specific location within the served area 110*a*, a request for location-based radio information in the specific location in the served area 110*a* may be sent to a remote location server such as the location server 130. The location-based radio information request may comprise information such as the specific location in the served area 110*a* and/or an identifier (ID) of the multi-radio mobile device 112. In step 604, upon receiving the location-based radio information request from the multi-radio mobile device 112, the location server 113 may be operable to identify a set of radio sites serving the specific location in the served area 110*a* according to the user ID in the received radio information request. In step 606, the location server 113 may be operable to retrieve radio quality information for the identified set of radio sites serving the specific location in the served area 110*a*. In step 608, the location server 130 may be operable to communicate the generated location-based radio information to the multi-radio mobile device 112. In step 610, the multi-radio mobile device 112 may be operable to select a radio site based on the location-based radio information received from the location server 130. In step 612, the multi-radio mobile device 112 may be operable to receive transmissions of a desired service from the selected radio site. The exemplary steps may end in step 614.

In various exemplary aspects of the method and system for location-based dynamic radio selection, a multi-radio mobile device such as the multi-radio mobile device 200 may comprise a plurality of different radios such as the WLAN radio 204 and the cellular radio 206. The multi-radio mobile device 200 may be operable to perform a location-based dynamic radio selection. For example, in instances where a location update occurs, the multi-radio mobile device 200 may acquire corresponding location-based radio information for a specific location from a remote location server such as the location server 300. The multi-radio mobile device 200 may be operable to select a radio, from the plurality of different radios, for use at the specific location based on the acquired location-based radio information. The acquired location-based radio information comprises available radios at the specific location and corresponding radio weights in the specific location for the available radios. An appropriate radio may be selected by the multi-radio mobile device 200 from the available radios based on the corresponding radio weights in the specific location. The multi-radio mobile device 200 may be operable to receive, in the specific location, transmissions of a desired service utilizing the selected radio. The signal strength of the received signals for the desired service may be measured by the multi-radio mobile device 200 at the specific location. As described with respect to FIG. 4, a location-based radio measurement report for the selected radio may be generated by the multi-radio mobile device 200 utilizing the signal strength measurements in the specific location, information on the selected radio in the specific location, and information on the specific location of the multi-radio mobile device 200. The generated location-based radio measurement report may be communicated to the location server 300 to build or refine the reference location-database 304. The location server 300 may be operable to track or receive a plurality of location related information such as location-based radio measurement reports corresponding to the specific location of the multi-radio mobile device 200 from a plurality of mobile devices. Radio quality information such as uncertainty levels or reliability levels of the available radios in the specific location of the multi-radio mobile device 200 may be calculated by the location server 300 utilizing the received plurality of location-based radio measurement reports. The corresponding radio weights of the available radios in the specific location may be determined based on the calculated radio quality information.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for location-based dynamic radio selection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication by a multi-radio mobile device, the multi-radio mobile device including a first radio designated for use with a first radio access technology and a second radio designated for use with a second radio access technology, the method comprising:

wirelessly acquiring, from an external device, location-based radio information for a specific location of the multi-radio mobile device, the acquired location-based radio information including radio weights corresponding to the first radio and the second radio; and selecting the first radio or the second radio for use in the specific location based on the radio weights of the acquired location-based radio information, wherein the radio weights are indicative of a communication quality of corresponding available radio access technologies at the specific location, and wherein at least one of the acquiring and selecting is performed by a processor.

2. The method according to claim 1, further comprising:
selecting the first radio access technology or the second radio access technology from the available radio access technologies based on the corresponding radio weights; and
selecting a radio, from among the first radio and the second radio, whose radio access technology corresponds to the selected radio access technology.

3. The method according to claim 2, further comprising:
receiving, at the specific location, signals of a desired service utilizing the selected radio; and
measuring, at the specific location, signal strengths of the received signals of the desired service over the selected radio.

4. The method according to claim 3, further comprising generating a location-based radio measurement report for the selected radio utilizing the signal strength measurements in the specific location, information on the selected radio in the specific location, and information on the specific location of the multi-radio mobile device.

5. The method according to claim 4, further comprising receiving a location update of the multi-radio mobile device from a remote location server.

6. The method according to claim 5, further comprising communicating the generated location-based radio measurement report to the remote location server.

7. The method according to claim 6, wherein the location-based radio information for the specific location is received from the remote location server.

8. The method according to claim 7, wherein the radio weights and the available radio access technologies of the location-based radio information is determined by the remote location server based on the generated location-based radio measurement report.

9. A system for communication, the system comprising:
a multi-radio mobile device, including:
    a first radio designated for use with a first radio access technology;
    a second radio designated for use with a second radio access technology; and
    one or more processors configured to:
        wirelessly acquire, from an external device, location-based radio information for a specific location of the multi-radio mobile device, the acquired location-based radio information including radio weights corresponding to the first radio and the second radio; and
        select the first radio or the second radio for use in the specific location based on the radio weights of the acquired location-based radio information,
    wherein the radio weights are indicative of a communication quality of corresponding available radio access technologies at the specific location.

10. The system according to claim 9, wherein the one or more processors are configured to select the first radio access technology or the second radio access technology from the available radio access technologies based on their corresponding radio weights in the specific location; and
wherein the one or more processors are configured to select a radio, from among the first radio and the second radio, based on whose radio access technology corresponds to the selected radio access technology.

11. The system according to claim 10, wherein the one or more processors are further configured to receive, at the specific location, signals of a desired service utilizing the selected radio; and
wherein the one or more processors are further configured to measure, at the specific location, signal strengths of the received signals of the desired service over the selected radio.

12. The system according to claim 11, wherein the one or more processors are further configured to generate a location-based radio measurement report for the selected radio utilizing the signal strength measurements in the specific location, information on the selected radio in the specific location, and information on the specific location of the multi-radio mobile device.

13. The system according to claim 12, further comprising:
a remote location server configured to send a location update to the multi-radio mobile device.

14. The system according to claim 13, wherein the one or more processors of the multi-radio mobile device are further configured to communicate the generated location-based radio measurement report to the remote location server.

15. The system according to claim 14, wherein the remote location server is further configured to receive the generated location-based radio measurement report and a plurality of location-based radio measurement reports corresponding to the specific location of the multi-radio mobile device from other mobile devices.

16. The system according to claim 15, wherein the remote location server is further configured to calculate radio quality information of the available radio access technologies in the specific location of the multi-radio mobile device utilizing the received generated location-based radio measurement report and the plurality of location-based radio measurement reports.

17. The system according to claim 16, wherein the remote location server determines the radio weights of the available radio access technologies in the specific location based on the calculated radio quality information.

18. The method according to claim 1, further comprising:
scanning a current location for available radio access technologies;
measuring signal strengths of the available radio access technologies;
generating a report that includes the available radio access technologies in correspondence with their signal strengths and their current location; and forwarding the report to a location server for future reference.

19. The method according to claim 8, further comprising calculating radio quality information of the available radio access technologies in the specific location of the multi-radio mobile device utilizing the generated location-based radio measurement report.

20. The method of claim 19, further comprising determining the radio weights of the available radio access technologies in the specific location based on the calculated radio quality information.

* * * * *